US00RE37293E

(19) United States
(12) Reissued Patent
Cloeren et al.

(10) Patent Number: US RE37,293 E
(45) Date of Reissued Patent: Jul. 24, 2001

(54) THERMAL TRANSLATOR DEVICE

(75) Inventors: Peter F. Cloeren; Richard L. Linam, both of Orange, TX (US)

(73) Assignee: Cloeren Incorporated, Orange, TX (US)

(21) Appl. No.: 09/574,631

(22) Filed: May 16, 2000

Related U.S. Patent Documents

Reissue of:
(64) Patent No.: 5,888,556
Issued: Mar. 30, 1999
Appl. No.: 08/815,470
Filed: Mar. 11, 1997

(51) Int. Cl.[7] ..... B29C 47/92
(52) U.S. Cl. ..... 425/141; 425/466
(58) Field of Search ..... 425/141, 143, 425/466, 190; 264/40.1, 40.6, 40.7; 219/200, 201, 221, 243, 472, 473

(56) References Cited

U.S. PATENT DOCUMENTS

| | | | | |
|---|---|---|---|---|
| 3,412,231 | * | 11/1968 | McElligott | 219/201 |
| 3,937,923 | * | 2/1976 | Smith | 219/201 |
| 3,940,221 | * | 2/1976 | Nissel | 425/141 |
| 4,454,084 | * | 6/1984 | Smith et al. . | |
| 4,726,752 | * | 2/1988 | Van Dun | 425/141 |
| 4,753,587 | * | 6/1988 | Djordjevic et al. | 425/141 |
| 4,854,844 | | 8/1989 | Carlsen . | |
| 5,208,047 | * | 5/1993 | Cloeren et al. | 425/141 |
| 5,259,747 | | 11/1993 | Cloeren . | |
| 5,423,668 | * | 6/1995 | Cloeren . | |
| 5,622,730 | * | 4/1997 | Nitta et al. | 425/141 |
| 6,017,207 | * | 1/2000 | Druschel | 425/141 |
| 6,019,924 | * | 2/2000 | Montalbano | 425/141 |

FOREIGN PATENT DOCUMENTS 367022 5/1990 (EP) .

OTHER PUBLICATIONS

Drawing of Extrusion Nozzle with Heat Isolation Standoffs (FIGS. 1–5).

* cited by examiner

*Primary Examiner*—David A. Simmons
*Assistant Examiner*—Robert Hopkins
(74) *Attorney, Agent, or Firm*—Timothy R. Kroboth

(57) ABSTRACT

A thermal translator device providing improved performance and faster expansion response, is described. Also described is an extrusion apparatus including a plurality of thermal translator devices operatively arranged for thermally actuated, localized action upon the lip. The thermal translator device includes a thermal energy source disposed within a structural member. The thermal energy source and the structural member are an integral unit. Also described is an extrusion apparatus including tie rods for a support assembly otherwise without support.

27 Claims, 6 Drawing Sheets

10
12
14
16
18
20
22
24
26
30
32
34
38
40
42
44
50
52
53
54
55
56
58
60
61
62
64
66
68
70
72
74
75
76
77
78
80
82
84
86
88
90
91
92
94
96
98
99
100
E

THERMAL TRANSLATOR DEVICE

Matter enclosed in heavy brackets [ ] appears in the original patent but forms no part of this reissue specification; matter printed in italics indicates the additions made by reissue.

BACKGROUND OF THE INVENTION

This invention relates to improved control of an extrusion apparatus lip gap.

As exemplified by U.S. Pat. Nos. 5,208,047 and 5,423,668, having Peter F. Cloeren as a common inventor, an extrusion apparatus having an adjustment assembly for thermal and mechanical, localized adjustment of lip gap, is known. In the '047 patent, a cartridge heater is removably disposed within a bore in a push rod which extends to operatively contact the flex lip thereof, and which is constructed of a thermally responsive material for expansion and contraction and thereby for thermal adjustment of the lip gap. Also described in the '047 patent is a temperature-responsive push rod with a resistance heater wire coiled around in direct heat transfer contact. In either case, the thermal output is adjusted in response to thickness measurement of the film or sheet passing through the lip gap.

As described in the '047 and '668 patents, a lip adjustment screw having an end bearing upon a push rod for mechanical adjustment of the lip gap, is likewise known. The lip adjustment screw may be in threaded engagement with a nut disposed in a shoulder recess. Variations using a differential thread, adjustment screw are also known, for instance, a differential thread, adjustment screw in axial alignment with a push rod, rather than offset from the push rod axis, with coarser pitch threads in engagement with a nut disposed in a shoulder recess and with finer pitch threads in engagement with the push rod. Alternatively, the finer pitch threads may be in engagement with a second nut.

Again with regard to thermal adjustment of the lip gap, the state of the art as further illustrated by U.S. Pat. Nos. 3,940,221 to Nissel, 4,454,084 to Smith et al, and 4,753,587 to Djordjevic et al, is a push rod of significantly greater length than the removably mounted, cartridge heater. As a result, the heating response of the push rod is dependent upon a substantially shorter heat source. The push rod functions as a translator to convert heat energy to mechanical force exerted upon the lip, by expansion and contraction.

In the Nissel device, the push rod passes through a thermal transfer block in which the cartridge heater is disposed. In the Smith structure and with particular reference to FIG. 3, a threaded push rod has an internally disposed cartridge heater, which by scale is about 70% of the push rod length. The Djordjevic device shown in FIG. 1 is similar, and by scale, the internally disposed cartridge heater is about 50% of the push rod length.

Also commercially known is an extrusion apparatus having a cartridge heater/push rod combination in which the internally disposed, cartridge heater is about 60% of the push rod length. In this apparatus, the push rod does not operatively contact the die lip; instead, this push rod bears upon another push rod which does operatively contact the die lip.

With reference particularly to FIG. 4 of Cloeren '047, the push rod structure corresponding thereto in commercial use, has a length of 6 inches and the cartridge heater has a length of 4 inches. In this device, the cartridge heater is about 66% of the push rod length.

The relatively greater length increases the structural mass of the push rod. In addition, whereas an exteriorly disposed, resistance heater wire as in FIG. 3 of Cloeren '047, provides for direct heat transfer contact with a temperature-responsive push rod, a drawback with an interiorly disposed, removable cartridge heater is lack of efficient thermal energy transfer to the temperature-responsive push rod.

Therefore, there is a long felt need to improve the performance of a thermal energy translator having an interiorly disposed, thermal energy source. More particularly, there exists a need for a thermal energy source/translator combination having faster expansion response, improved heat transfer from the thermal energy source to the thermal energy translator, and a more beneficial balance between the length of the heat source and the length of the thermal energy translator. In addition, there is an over-arching need to improve energy efficiency in connection with thermal control of the lip gap.

SUMMARY OF THE INVENTION

It is accordingly an object of the present invention to provide improved performance to an extrusion apparatus including thermal energy translators each having an interiorly located, heat source.

It is, in particular, a further object to provide faster expansion response.

It is a still further object to improve thermal energy efficiency in connection with thermal control of the lip gap.

Additional objects, advantages and novel features of the present invention are set forth in the description that follows, and in part will become apparent to those skilled in the art upon examination of the following description or may be learned by practice of the invention.

In a typical prior art, cartridge heater, the outer sleeve or sheath is fabricated as thin as possible, nominally about 0.06 inches, so as to allow thermal transfer therethrough as quickly and efficiently as possible. As a result, a cartridge heater does not have the structural strength to be useful in an extrusion apparatus as a translator to convert heat energy to mechanical force. Moreover, the air gap between the interiorly disposed, removable cartridge heater and surrounding push rod structure, reduces thermal efficiency.

To achieve the foregoing objects and in accordance with the purpose of the present invention, as embodied and broadly described herein, there is beneficially provided a thermal translator device which includes a thermal energy source disposed within a thermally responsive structure. As will become understood, the thermal energy source is inseparable from the integral to a thermally responsive structure effective for converting heat energy to mechanical force by expansion and contraction.

In an advantageous embodiment, the thermal translator device includes a thermal energy source swaged in a structural member or sleeve of appropriate mechanical integrity to provide the column strength necessary to serve as a thermal energy translator. In a preferred embodiment, the structural member consists of an inner tube and an outer member, and the outer member is swaged onto the inner tube so that the inner tube and outer member are inseparable from one another. Swaging beneficially produces an integral thermal translator assembly and eliminates air gaps interfering with heat conduction.

Typically, the thermal energy source is a resistance heater wire wrapped around an insulating core. It is highly preferred that this structure or like structures, and the translator are of substantially the same length. By "substantially the same length" is meant that the length is about 85% or more of the length of the thermal energy translator.

Also in accordance with the present invention and with reference to an individual assembly for localized gap adjustment, there is provided an extrusion apparatus including a lip forming an exit opening or slot which extends along the width of the apparatus, and including a flow passageway that terminates in the exit opening. Beneficially, the apparatus includes an assembly for thermally actuated, localized adjustment of the gap of the exit orifice, by localized action upon the lip. This assembly includes a plurality of spaced-apart, thermal energy sources operatively arranged and preferably independently controllable to provide localized adjustment. Beneficially, thermal translator devices in accordance with the present invention, are used for the localized action upon the lip.

In accordance with a preferred embodiment of the invention, localized action upon the lip, is provided by a lip adjustment member which operatively contacts the lip, a thermal translator device in accordance with the invention which bears upon the lip adjustment member, and a mechanical lip adjustment screw which bears upon the thermal translator.

In the drawing and detailed description of the invention that follow, there are shown and essentially described only preferred embodiments of this invention, simply by way of illustration of the best mode contemplated of carrying out this invention. As will be realized, this invention is capable of other and different embodiments, and its several details are capable of modification in various requests, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

The present invention is directed to a novel extrusion apparatus for manufacturing a web of controlled thickness, and can take the form of a straight slit or circular extrusion die useful in processing a thermoplastic melt stream. The apparatus can be adapted for extrusion into an air space or onto a casting drum.

In a typical apparatus having automated, thermally-controlled, lip gap adjustment, thermal control is regulated and localized expansion or contraction of the lip gap is provided by expansion or contraction of a respective push rod, in response to measurement of the web thickness. By the present invention, performance and response time in controlling the lip gap, are significantly improved using thermal translator devices each having an interiorly disposed, heat source.

Figure 1:
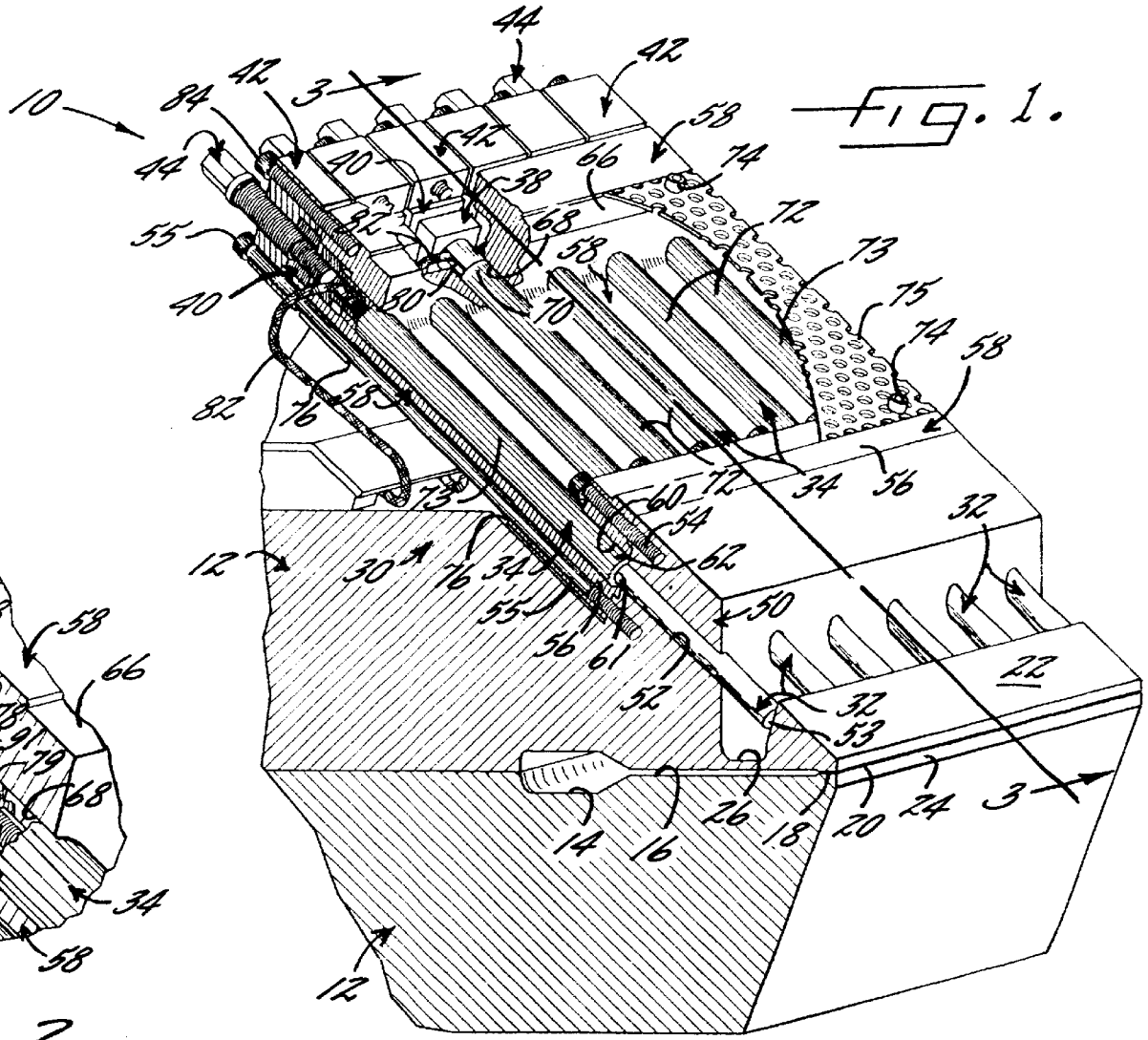
FIG. 1 is an isometric view in partial section of a preferred embodiment of an extrusion apparatus in accordance with the present invention.
Figure 2:
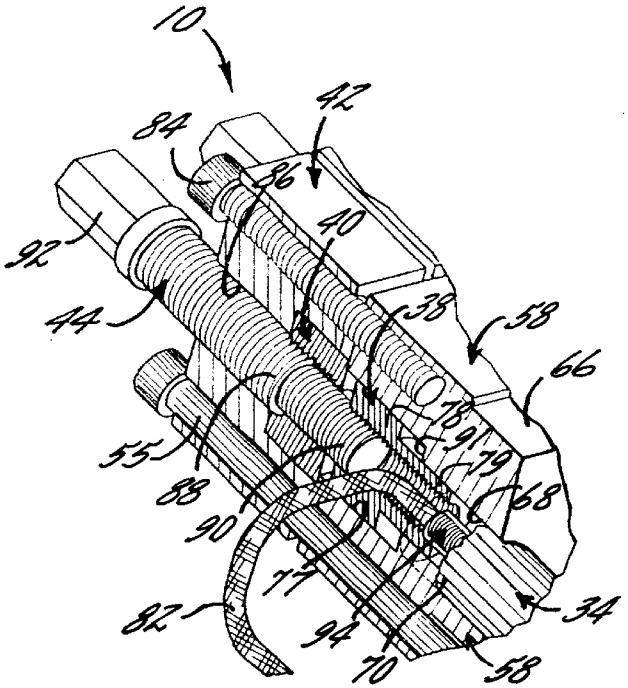
FIG. 2 is an enlarged view of features of the extrusion apparatus of FIG. 1.
Figure 3:
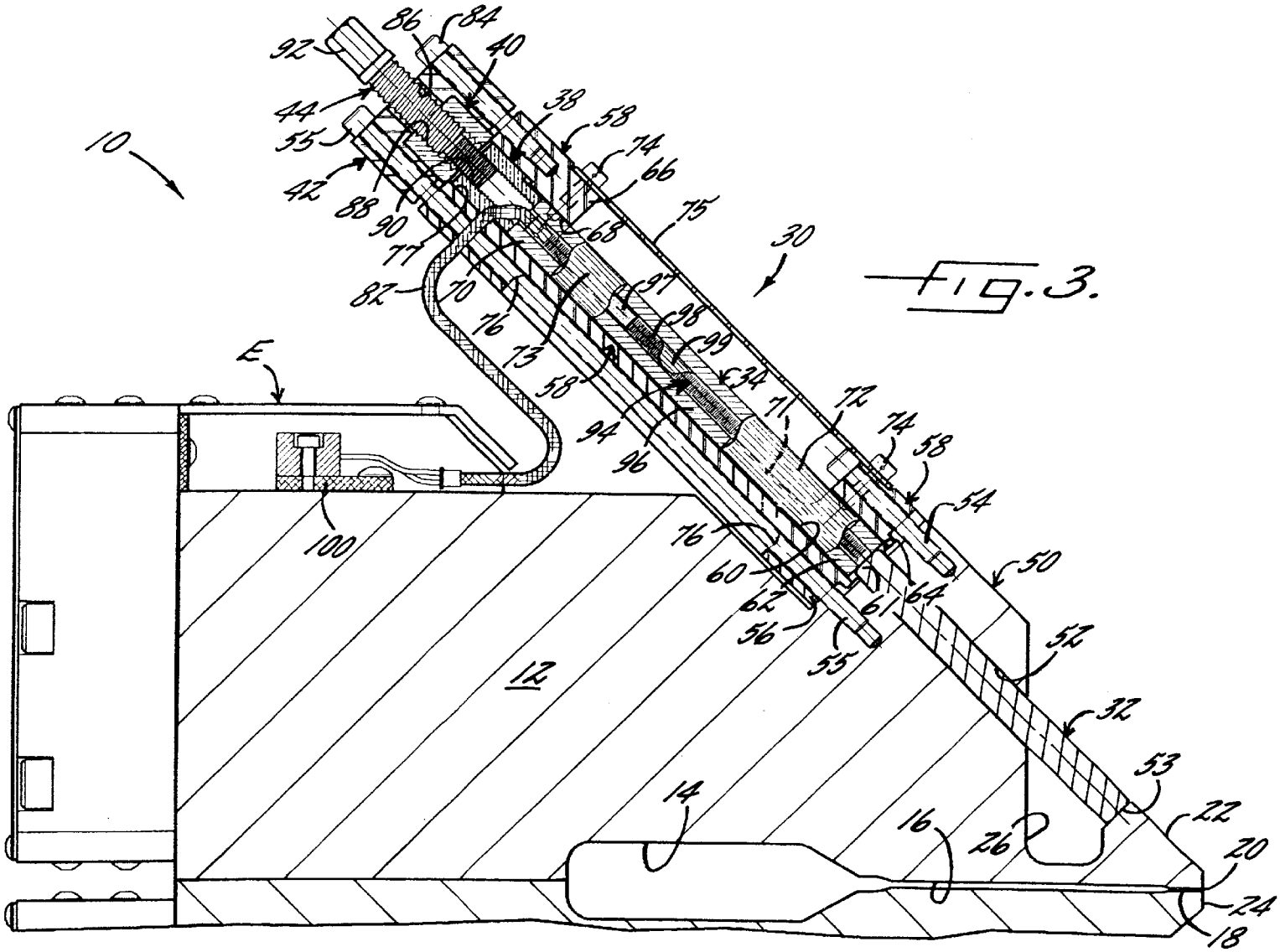
FIG. 3 is an enlarged cross-sectional view taken substantially along line 3—3 of FIG. 1, revealing details of a preferred thermal translator device in accordance with the present invention.

Referring to FIGS. 1 to 3, preferred embodiment of an extrusion apparatus 10 providing for mechanical and thermal, localized adjustment of web thickness in accordance with the present invention, is shown. The apparatus includes a main body 12 having a flow passageway which includes a transverse flow-providing manifold 14 and a passageway portion 16 connecting the manifold and an exit channel 18 which terminates in an exit slot 20 formed by lips 22,24. The exit channel is typically of smaller gap than connecting channel 16, and as indicated, exit orifice 20 extends along the appropriate width.

Lip 22 is beneficially flexible to the extent that it can be locally deformed by physical pressure to provide local adjustment of the gap of the exit orifice. To this end, lip 22 has a necked down portion defined by a recess 26, which allows for flexing of the lip, thereby providing thickness control of the web.

In accordance with the present invention, advantageously providing for localized action upon lip 22 and with reference to an individual assembly, is a gap-adjusting assembly 30 beneficially including a lip adjustment member 32 which operatively contacts lip 22, a thermal translator device 34 which bears upon lip adjustment member 32, and a mechanical lip adjustment assembly which bears upon translator 34 and includes lip adjustment nuts 38,40, a lip adjustment nut retainer 42 and a lip adjustment screw 44. Preferably, lip adjustment member 32, translator 34 and lip adjustment screw 44 are in axial alignment. A drawback of a variation in which a lip adjustment screw is offset from the longitudinal axis of the translator, is that a bending moment may be induced in the translator. In addition to mediating mechanical adjustment initiated using adjustment screw 44, translator 34 provides for thermally actuated control of the lip gap.

Support structure of extrusion apparatus body 12 for gap-adjusting assembly 30 includes a shoulder 50 having a smooth bore 52. A lip-flexing extension of generally cylindrical, lip adjustment member 32 extends from shoulder bore 52 and has an opening end 53 in contact with flex lip 22. Lip adjustment member 32 freely moves axially within the generally cylindrical, shoulder bore except as limited by physical contact at its ends.

Attached to shoulder 50 by fasteners 54,55 and advantageously using a tongue-and-groove mechanical fit is a lip end 56 of a translator block 58 conveniently having a width generally coextensive with that of shoulder 50 of main body 12. Translator block 58 has a smooth bore 60 in axial alignment with shoulder bore 52; and, with particular reference to FIG. 3, an end 61 of lip adjustment member 32 extends out of the shoulder bore and into bore 69 for contact by a lip end 62 of generally cylindrical translator 34, which extends into generally cylindrical bore 60. End 61 of lip adjustment member 32 is beneficially generally rounded, thereby reducing the contact area with and thermal conduction from lip end 62 of translator 34.

With particular reference to FIG. 3, an air space disposed between lip end 62 of translator 34 and a grooved wall 64 of shoulder 50 defines the axial stroke of translator 34. This axial stroke is a mechanical and/or thermal result. Grooved wall 64 limits the stroke in the lip direction; thus, when lip end 62 is in contact with the wall, end 61 of the lip adjustment member will not extend into bore 60. In a more typical position, however, the air space separates lip end 62 from wall 64, with the air space varying in axial length depending upon the gap of exit orifice 20.

As may be understood by comparison with the push rod structure of the '047 patent, therein the thermally responsive, push rod with a cartridge heater disposed within, extends to operatively contact the flex lip. Not only is the push rod substantially longer than the cartridge heater but also there is additional push rod structural mass; and the additional push rod structural mass extending from the shoulder bore and having an operating end in contact with the flex lip, serves as a heat sink. More precisely, the entire push rod structure thereof tends to become generally isothermal, as a result of which the additional push rod structural mass draws heat by conduction from the portion of the push rod surrounding the cartridge heater, and therefore requires comparatively more thermal output. By the present invention, there is no need to heat lip adjustment member 32 for thermally actuated adjustment of the gap.

With continuing reference to FIGS. 1 to 3, translator block 58 extends away from lip 22, underlies translator 34, and terminates in an opposite end 66 having a smooth bore 68 which surrounds an end 70 of translator 34 opposite from lip end 62. Translator 34 freely moves axially within bores 60,68 except as limited by physical contact at its ends. With particular reference to FIG. 1 and as also indicated by hidden line 71 in FIG. 3, an exterior surface 72 of the upper diameter of a translator portion 73 disposed between bores 60,68 is thereby beneficially exposed to atmospheric air to hasten the cooling, and consequently shorten the contraction cycle. In this way, rapid cooling cycles may be achieved by convection and radiation. Fasteners 74 connect an apertured cover plane 75 to translator block 58, which is grooved to receive the cover plate.

Cooling is also enhanced by a recess 76 in the translator block portion underlying mid-portion 73 of translator 34, in combination with, as known in the prior art, a push rod/heat source being disposed in a position further removed from the environment of main body 12 than the push rod of the '047 patent is located.

Referring particularly to FIG. 2, the end 66 of translator block 58 is provided with a continuous groove 77. Continuous groove 77 has parallel walls which match the size of a generally square head portion 78 of lip adjustment nut 38. This fit of nut heat 78 within the groove prevents rotation of the nut; however, as will become understood, nut 38 does have an axial back-and-forth movement in response to the rotation of lip adjustment screw 44.

Nut 38 further includes a generally cylindrical body portion 79, which is disposed within bore 68 and which is in bearing contact with opposite end 70 of translator 34. The cylindrical body portion, which is provided with a threaded bore, includes a widthwise slot 80, best seen in FIG. 1, which provides communication to the threaded bore for a power lead 82 to the electrical energy source of translator 34.

With continued particular reference to FIG. 2, attached by fasteners 55,84 to end 66 of translator block is nut retainer member 42 including a shaped recess in which lip adjustment nut 40 is advantageously captively disposed, and including a smooth bore 86 in axial alignment with a threaded bore of nut 40. Extending through smooth bore 86 and in threaded engagement with the threaded bore of nut 40 and with the threaded bore of nut 38 is right hand threaded, lip adjustment screw 44. Screw 44 is beneficially a differential thread, adjustment screw which has a relatively greater diameter portion and coarser pitch threads 88 in engagement with the bore of lip adjustment nut 40, and a relatively smaller diameter portion and finer pitch threads 90 in engagement with the bore of lip adjustment nut 38.

Nut 40 neither rotates nor moves axially in response to rotation of screw 44. Axial movement of nut 38 is determined by the difference in the thread pitch of portions 88,90. The axial travel of nut 38 is limited in the lip direction by a bottom wall 91, best seen in FIG. 2, of continuous groove 77. An air gap between nuts 38,40 increases in axial length as nut 38 travels in the direction of the lip, and decreases in axial length as nut 38 travels toward nut 40. Screw 44 has a head 92 which is engageable by a wrench or otherwise for axial movement of nut 38, and in response thereto, for mechanical axial movement of translator 34 and mechanical axial movement of lip adjustment member 32.

In prior art such as the '047 patent, in which a cartridge heater is removably disposed within a bore in a temperature responsive push rod, there is a lack of efficient thermal energy transfer to the temperature-responsive push rod. Easy insertion and removability of the cartridge heater dictate a mechanical clearance between the cartridge heater and the bore. Typically, the clearance will range from about 0.004 to 0.010 inches, with a relatively greater clearance being necessary for a relatively longer cartridge heater or for a relatively larger diameter cartridge heater. This clearance or air gap substantially reduces the efficiency of thermal energy transfer, with a relatively greater clearance reducing the efficiency to a relatively greater extent and extending the response time. In accordance with the present invention, a thermal translator device is provided which significantly improves performance and response time.

With particular reference to preferred translator 34 as shown in FIG. 3, a heater portion 94 is advantageously inseparable from and an integral part of a surrounding tubular portion 96 which is of sufficient column strength to serve as a thermal energy-to-mechanical force translator. Heater portion 94 suitably includes an insulating core 97 around which is wrapped a heat source in the form of a resistance heater wire 98. An electrically insulating, thermally conductive material 99 disposed between the wire-wrapped core and tubular portion 96, beneficially provides for efficient heat transfer to temperature-responsive, tubular portion 96. Power lead 82 terminates in an electrical box E covering electrical power supply terminal 100, which is advantageously in communication with and under control of web thickness measurement means. Typically, each thermal translator device is beneficially independently controllable in response to the measured web thickness.

A convenient manufacturing process for translator 34 includes disposing a resistance heater wire-wrapped insulating core, for example, a nickel-chromium wire-wrapped ceramic core, in a cylindrical tube of sufficient structural or column strength to function as the thermal energy translator, and filling the air space within the tube with an electrically insulating, thermally conductive powdery material such as magnesium oxide. The tube is beneficially of about the same length as the wire-wrapped insulating core, and may be made of any suitable structural material, with stainless steel being useful. The filled tube is vibrated to remove air and increase the density of the thermally conductive fill and if necessary additional thermally conductive fill is then added, and to provide the compaction appropriate for efficient heat transfer, the filled tube is then subjected to swaging, as a result of which the filled tube is reduced in diameter and the thermally conductive material is thereby compacted. As a result, there is provided a swaged thermal translator device. A like process is used to make commercial cartridge heaters, except that, as earlier explained, the tubular structure used for such purpose lacks sufficient column strength to function as a thermal energy translator.

As indicated in FIG. 1, a plurality of lip gap-controlling assemblies 30 are arranged in a spaced-apart relationship along the width of an extrusion apparatus 10 in accordance with the present invention. Each of these assemblies includes a translator 34, and each of these assemblies is operatively arranged to adjust the exit opening at an individual location by expansion and contraction.

In operation of extrusion apparatus 10, heat output of all gap-controlling heat sources 98 (one shown in FIG. 3) is set to a selected control value typically in the range of 40 to 60 percent of the full power value. Thereafter, the lip gap is manually adjusted to the required lip gap profile by rotation of the head of each adjustment screw 44 in the desired direction, and flow through the lip gap is commenced. Conventional means (not shown) measure web thickness and provide for increased or decreased heat output of appropriate heat sources in order to produce appropriate localized changes in the lip gap to compensate for thickness variation in the web. Tubes 96 (one shown in FIG. 3) expand or contract in response to the change in the thermal input source. Thermal translator devices 34 increase the efficiency of thermal energy transfer to tubes 96, thereby providing thermal control of the lip gap with increased efficiency. Direct exposure of translators 34 to air additionally improve performance.

Compared to the cartridge heater/push rod combination of the '047 patent, translator 34 is beneficially easily removable, even while the extrusion apparatus is operating, and because of cost advantages, may be discarded as a unit. To withdraw an individual translator 34, the respective nut retainer member 42 is detached from end 66 of translator block 58 by removal of respective fasteners 55,84, after which translator 34 may be withdrawn from the translator block.

Figure 4:
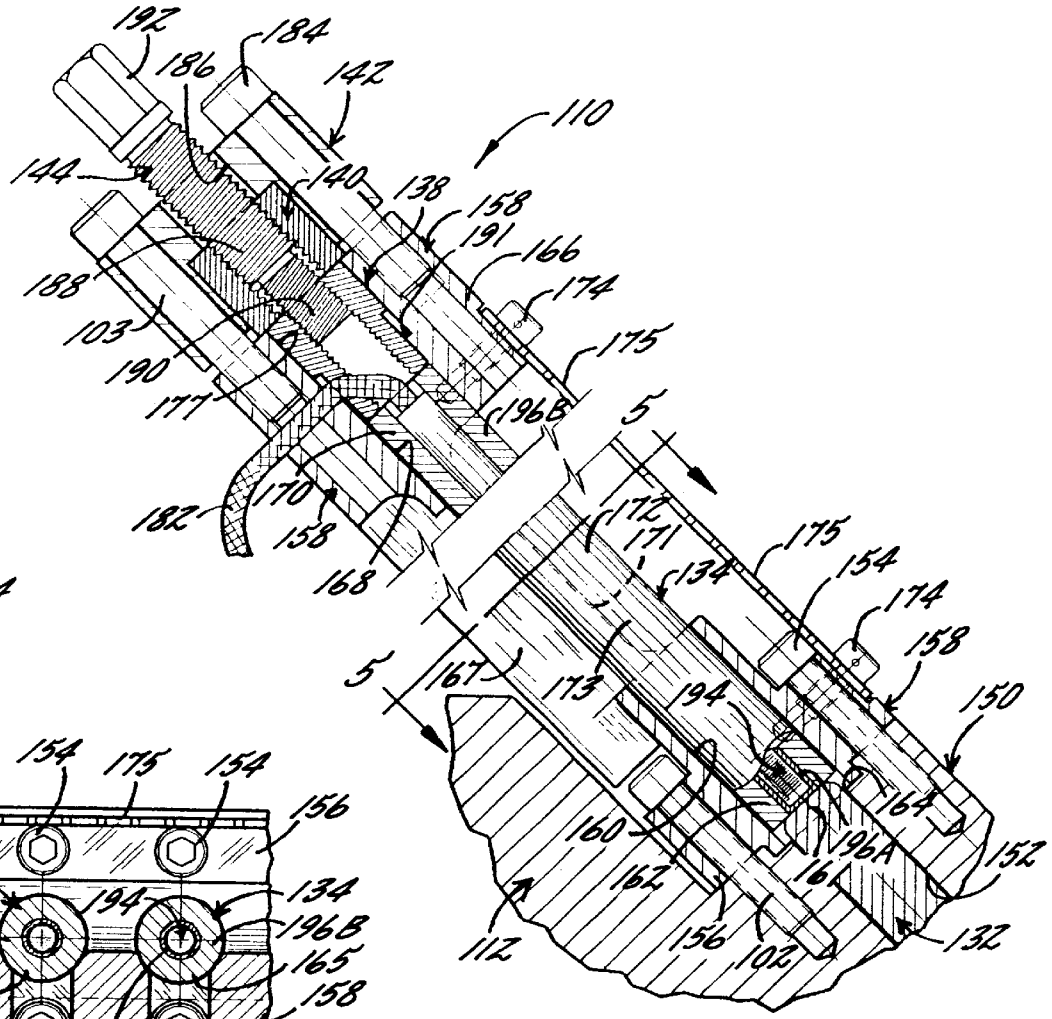
FIG. 4 is a partial cross-sectional view of a variation of the gap-adjusting assembly of FIGS. 1–3.
Figure 5:
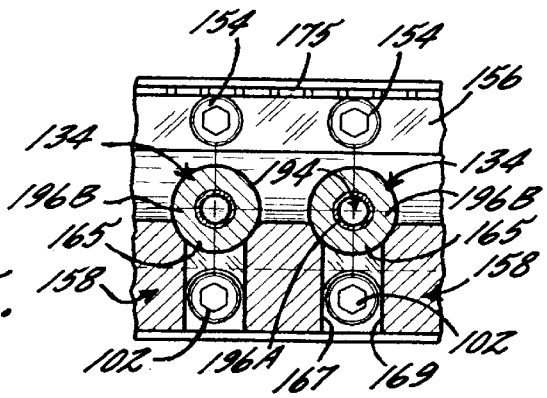
FIG. 5 is a cross-sectional view taken substantially along line 5—5 of FIG. 4.

It will be appreciated that useful variations in the structure of a thermal translator device in accordance with the present invention, exist. For example, the combination of a relatively thinner walled, inner tube and a relatively thicker walled, outer tube, as illustrated in FIGS. 4 and 5, may be used. Selection of a single walled translator device as shown in FIGS. 1–3, or a multi-walled translator device depends upon considerations including the particular performance requirements.

The double-walled translator device of FIGS. 4 and 5 may be made as follows. The previously described manufacturing process may be carried out with a relatively thinner walled tube having inadequate column strength to function as a push rod (hereafter referred to as the inner tube) to produce a swaged structure analogous to commercially available cartridge heaters, and thereafter the resultant intermediate product may be inserted into a relatively thicker walled, outer member having adequate structural or column strength independently or in combination with the thinner walled tube, and beneficially of close fit with the outer surface of the intermediate swaged product. The outer member is then swaged onto the inner tube whereby a thermal translator device in accordance with the invention is made, in which the thermal energy source and the double-walled structural member are an integral unit, and the inner tube and outer member are inseparable and there is no air gap between the inner tube and outer member. This approach has the benefit of using a more easily processable tube for obtaining suitable compaction of the electrically insulating, thermally conductive powder by swaging. Swaging is beneficially used to provide contiguous contact between the inner and outer members.

Figure 7:
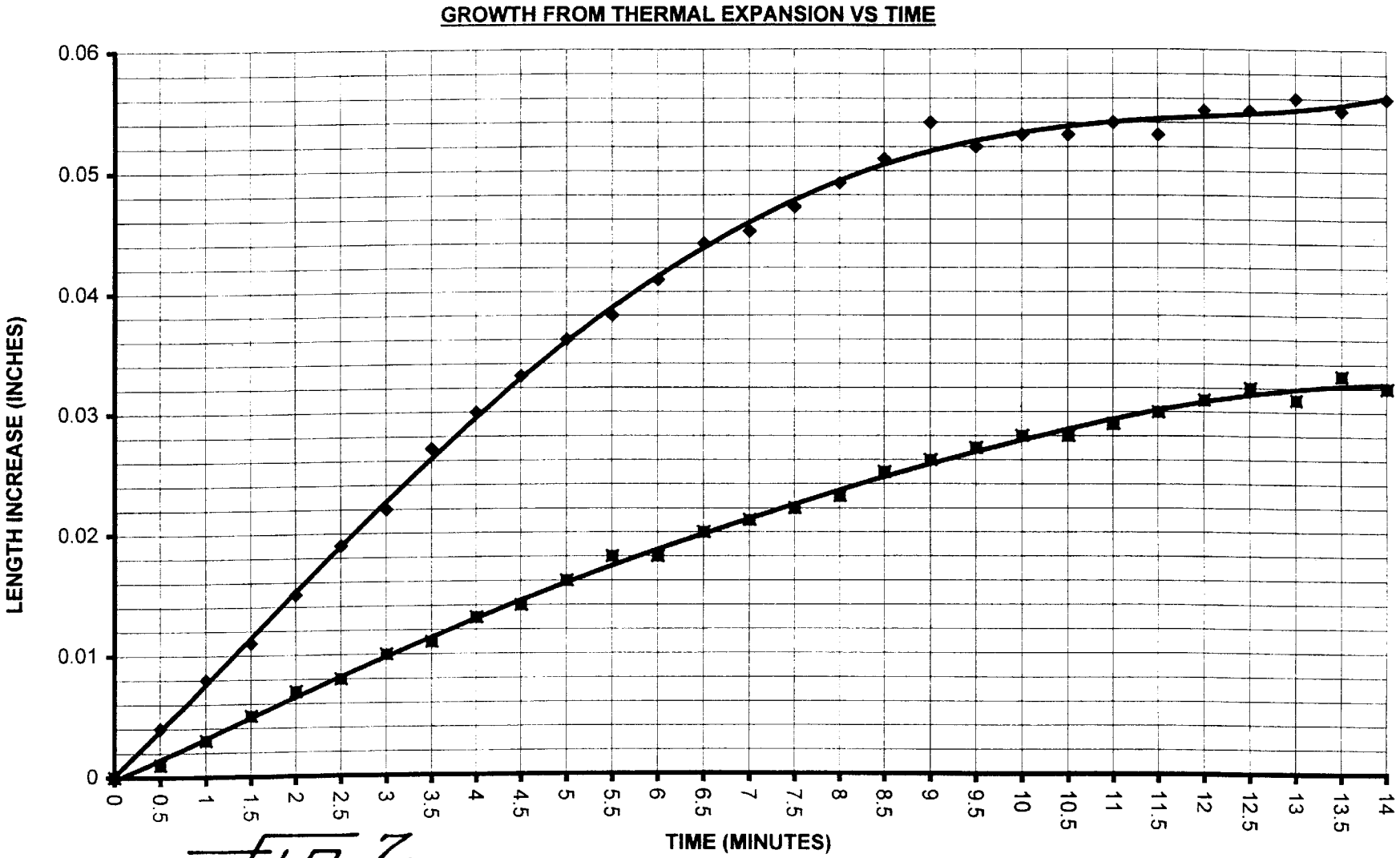
FIGS. 7 and 8 are graphs demonstrating improvement in performance using a thermal translator device in accordance with the present invention.
Figure 8:
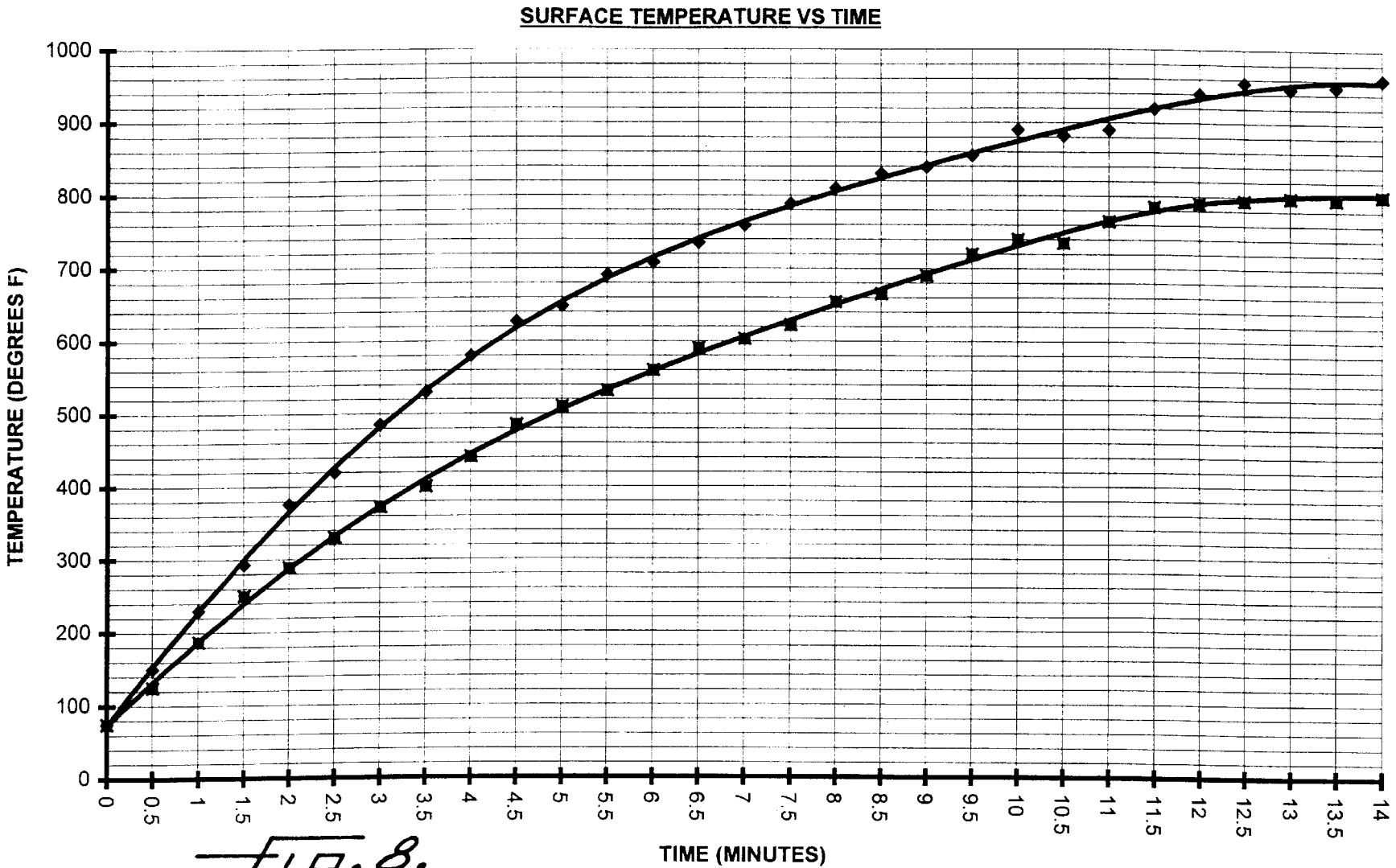

With reference to FIGS. 7 and 8, performance of a double-walled, thermal translator device in accordance with the invention (indicated by diamonds) is compared with performance of the cartridge heater/push rod combination of Cloeren '047 (indicated by squares). In making this comparison, an off-the-shelf cartridge heater/push rod is used; and the comparison is carried out with no mechanical load, in other words, with the devices separate and apart from an extrusion apparatus body. In the case of the double-walled device, the length of the heater coil (or thermal element) is about 92% of the length of the double-walled tubular structure, with the heater coil having a length of 5.5 inches and the tubular structure having a length of 6 inches; and the diameter of the translator device is ⅝". By comparison, in the off-the-shelf cartridge heater/push rod, the heater coil length is 3.5 inches (the cartridge heater actually being 4 inches long), and the push rod is 6 inches long, resulting in the heater coil length being 58% of the push rod length; and the push rod has a square cross-section measuring ⅝". The heaters of both are of the same watt density.

Compared to the cartridge heater/push rod combination of Cloeren '047, the heater portion is, as mentioned, inseparable from and integral to the double-walled, tubular structure. Moreover, the double-walled translator device lacks an air gap between the heat source thereof and the cylindrical tubing which functions as the thermal energy translator.

As demonstrated in FIG. 7, a thermal translator device in accordance with the present invention, has a significantly greater length increase per given unit of time, and for up to 14 minutes, has a greater length increase. As demonstrated in FIG. 8, a thermal translator device in accordance with the present invention, has a significantly greater surface temperature per given unit of time, and for up to 14 minutes, has a greater surface temperature. Thus, the extra push rod length without an internal heater portion, and the extra push rod mass of the cartridge heater/push rod combination, dampens the rate of elongation and restricts the maximum temperature attainable per given unit of time. However, even if the mass of the push rod of Cloeren '047 were reduced to be equal to the mass of the double-walled translator device tested, and even if the heater coil lengths were the same, a thermal translator device in accordance with the present invention, would nevertheless provide better performance due to lack of the air gap.

In accordance with the present invention, a preferred ratio of the length of the thermal element or heater portion to the length of the translator structure is about 80% or more, with about 90% or more being highly preferred. A suitable length of the translator structure is typically about 6"; other lengths, of course, may be used depending upon operating needs, provided that the length of the thermal element is correspondingly adjusted.

Figure 6:
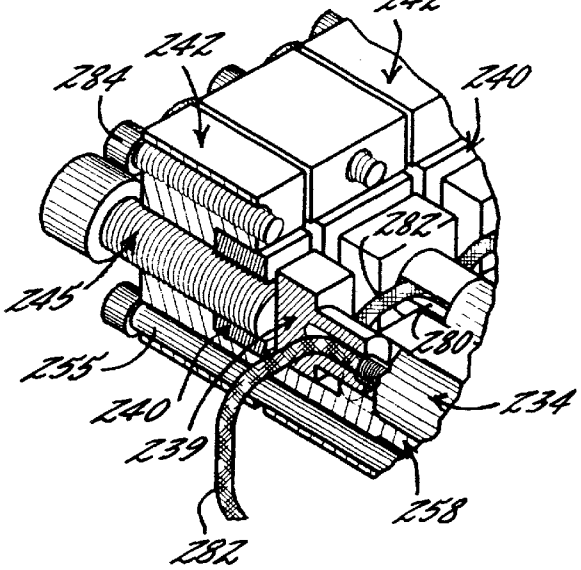
FIG. 6 is a partial cross-sectional view of a variation of the mechanical adjustment end of the gap-adjusting assembly of FIGS. 1–3.

Referring to FIGS. 4–6, parts identical to FIGS. 1–3 are designated with like numbers. FIGS. 4 and 5 show a preferred extrusion apparatus 110 in accordance with the present invention, which includes several modifications. A lip end 156 of a translator block 158 is modified to replace elongated fastener 55 with two fasteners 102,103. In addition, as clearly shown in FIG. 5, a lower diameter portion 165 of thermal translator 134 disposed between bores 160,168, is exposed to atmospheric air by removal of underlying translator block 158. Side walls 167,169 created thereby, are shown in FIGS. 4 and 5. Moreover, as indicated earlier, the thermal energy-to-mechanical force translator structure includes a relatively thinner, interior wall 196A and a relatively thicker, exterior wall 196B. As may be understood, each of these modifications can be used independently in the embodiment of FIGS. 1–3.

With reference to FIG. 6, a lower portion of an adjustment screw 245, which is not of the differential thread type, is in threaded engagement with a captively disposed, threaded member 240 inserted in a recess in a nut retainer member 242. An end of the adjustment screw bears upon an upper end of an adjustment member 239 having a smooth bore and provided with a slot 280 for communication of a power lead 282 to the bore. Adjustment member 239 bears upon a thermal translator 234 in accordance with the present invention.

Figure 9:
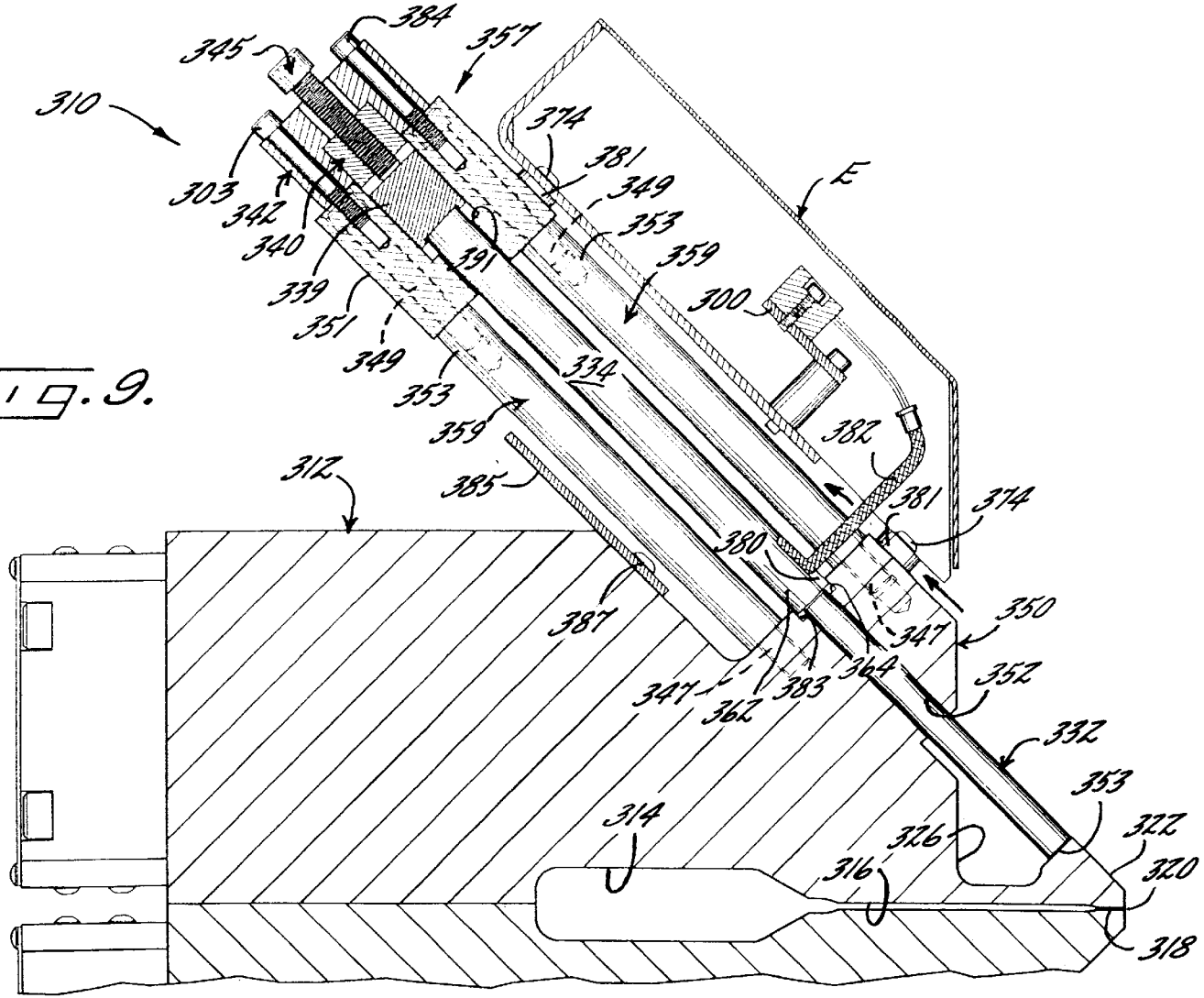
FIG. 9 is a partial cross-sectional view similar to FIG. 3, of another variation of an extrusion apparatus in accordance with the present invention.

Referring to FIG. 9, parts identical to the prior Figures are designated with like numbers. Preferred extrusion apparatus 310 in accordance with the present invention, beneficially further improves thermal separation between the plurality of thermal translator devices and body 312, and further improves air flow to the translator devices. The translator block is replaced by an adjustment assembly 357 including an adjustment screw 345, and by a plurality of the rods 359. As indicated by arrows, air flows by convection between body 312 and an electrical box E spaced above body 312 by spacers 381 and attached by fasteners 374 to body 312 and adjustment assembly 357. Each power lead 382 communicates with the heat source of the respective translator 334 through an elongated slot 380 in a lip end 362 of the respective translator. A widthwise groove 383 in shoulder 350 serves as a guide for lip end 362. A reflective heat shield 385 disposed between the thermal translator devices and body 312, is attached to body 312 by fasteners 387 (only one shown).

*As can be understood from FIGS. 1 and 9, tie rods 359 are spaced apart vertically and horizontally relative to one another.* Tie rods 359 are secured to shoulder 350 by threaded ends 347 engaged with threaded bores in shoulder 350. The tie rods secure adjustment assembly 357 by fasteners 349 which extend through smooth bores in [an adjustment] *a* block 351 of assembly 357 and which engage threaded bores in tie rod ends 353 disposed opposite to tie rod ends 347. *As thus may be understood, block 351 is spaced apart from body 312, but tie rods 359 tie block 351 to shoulder 350 of body 312.*

*With continued reference to FIG. 9, block 351 includes a further plurality of bores (only one shown) each receiving the respective translator 334 opposite its lip end 362.* Similar to FIG. 6, adjustment screw 345 bears upon an upper end of an adjustment member 339, which bears upon *the respective* thermal translator 344. *As in the embodiment of FIGS. 1 to 3, a wall 364 of shoulder 350 leads to a plurality of throughbores 352 (only one shown), and by contact with the lip end 362, limits the axial stroke of the respective translator 334 in the lip direction. Each translator 334 is in contact with an elongated member 332, which is in contact with the lip 322, and each elongated member has an axial portion which reciprocally moves within its respective throughbore 352.*

Having described the invention in detail and by reference to preferred embodiments thereof, it will be apparent that modifications are possible without departing from the scope of the invention herein described. Several modifications have been briefly mentioned for purposes of illustration.

We claim:

1. Apparatus comprising a translator device comprising a thermal energy source disposed within a thermally responsive structural member in operative bearing association with a force responsive member for displacement of said force responsive member through axially-directed mechanical force, said thermal energy source and said thermally responsive structural member being inseparably utilized, and said thermally responsive structural member being a bearing column.

2. The apparatus of claim 1, wherein said structural member comprises concentric tubes.

3. The apparatus of claim 1, wherein said thermal energy source is a resistance heater, wherein an axially movable elongated member is disposed between said translator device and said force responsive member, and wherein said thermal energy source is substantially the same length as said structural member.

4. The apparatus of claim 1, wherein said structural member is a swaged tubular member.

5. An extrusion apparatus comprising a lip forming an exit opening having a gap which extends along the width of said apparatus, and means for automated, localized adjustment of thickness of a web exiting from said gap; said automated adjustment means comprising a translator device comprising a thermal energy source disposed within a thermally responsive structural member in operative bearing association with said lip for displacement of said lip through axially-directed mechanical force, said thermal energy source and said thermally responsive structural member being inseparably utilized, and said thermally responsive structural member being a bearing column.

6. The extrusion apparatus of claim 5, wherein said automated adjustment means further comprises an axially movable elongated member having an operating end in bearing contact with said lip, and an opposite end with which a lip end of said translator device is in contact.

7. The extrusion apparatus of claim 6, further comprising a body portion having a throughbore in which a portion of said elongated member reciprocally moves, wherein in a first position, said opposite end of said elongated member extends out of said throughbore for said contact by said lip end.

8. The extrusion apparatus of claim 5, wherein said structural member comprises concentric tubes.

9. The extrusion apparatus of claim 5, wherein said thermal energy source is a resistance heater wire wrapped around an insulating core.

10. The extrusion apparatus of claim 5, wherein said structural member is a swaged tubular member.

11. The extrusion apparatus of claim 6, wherein said thermal energy source is substantially the same length as said structural member.

12. The extrusion apparatus of claim 5, wherein said structural member comprises steel.

13. An extrusion apparatus comprising a lip forming an exit opening having a gap which extends along the width of said apparatus; means for automated, localized adjustment of thickness of a web exiting from said gap, comprising a plurality of lip adjustment members in operative bearing association with said lip for displacement of said lip; a support assembly comprising a plurality of bores for receiving said lip adjustment members; and a plurality of spaced apart tie rods that tie said support assembly to a body portion of said apparatus, said support assembly being otherwise without support.

14. The extrusion apparatus of claim 13, wherein said lip adjustment members are thermal translator devices.

15. The apparatus of claim 13, wherein said lip adjustment members comprise lip ends and ends opposite thereto, said opposite ends being disposed in said bores.

16. The apparatus of claim 1, wherein said structural member comprises steel.

*17. The apparatus of claim 13, wherein said tie rods are spaced apart vertically and horizontally relative to one another.*

*18. The apparatus of claim 13, wherein said body portion comprises a stroke-limiting wall leading to a plurality of throughbores, and said stroke-limiting wall limits the stroke of said lip adjustment members in the lip direction.*

*19. The apparatus of claim 13, wherein said support assembly comprises a block comprising said plurality of bores.*

*20. An extrusion apparatus comprising a lip forming an exit opening having a gap which extends along the width of said apparatus; a plurality of lip gap-controlled assemblies for automated, localized adjustment of thickness of a web exiting from said gap, comprising a plurality of lip adjustment members in operative bearing association with said lip for displacement of said lip; a support assembly comprising a plurality of bores for receiving said lip adjustment members, said support assembly being spaced apart from said body portion; and a plurality of spaced apart tie rods that tie said support assembly to a body portion of said apparatus, said support assembly being otherwise without support.*

*21. The apparatus of claim 20, wherein said tie rods are spaced apart vertically and horizontally relative to one another.*

*22. The apparatus of claim 20, wherein said body portion comprises a stroke-limiting wall leading to a plurality of throughbores, and said stroke-limiting wall limits the stroke of said lip adjustment members in the lip direction.*

*23. The apparatus of claim 20, wherein said support assembly comprises a block comprising said plurality of bores.*

*24. An extrusion apparatus comprising a body portion comprising a stroke-limiting wall leading to a plurality of throughbores, and a lip forming an exit opening having a gap which extends along the width of said apparatus; an assembly for automated, localized adjustment of thickness of a web exiting from said gap, comprising a plurality of translator devices comprising thermal energy sources disposed within thermally responsive structural members, in operative bearing association with said lip for displacement of said lip, wherein said stroke-limiting wall limits the stroke of said translator devices in the lip direction; a support assembly comprising a plurality of bores for receiving said plurality of translator devices, said support assembly being spaced apart from said body portion; and a plurality of spaced apart tie rods that tie said support assembly to said body portion, said support assembly being otherwise without support.*

*25. The apparatus of claim 24, wherein said tie rods are spaced apart vertically and horizontally relative to one another.*

*26. The apparatus of claim 24, wherein said support assembly comprises a block comprising said plurality of bores.*

*27. The apparatus of claim 24, wherein said translator devices are in contact with elongated members and said elongated members are in contact with said lip, wherein each of said elongated members has an axial portion which reciprocally moves within its respective throughbore, and wherein said translator devices contact said stroke-limiting wall at the end of said stroke in the lip direction.*

* * * * *

UNITED STATES PATENT AND TRADEMARK OFFICE

CERTIFICATE OF CORRECTION

PATENT NO. : RE 37,293 E
APPLICATION NO. : 09/574631
DATED : July 24, 2001
INVENTOR(S) : Peter F. Cloeren and Richard L. Linam It is certified that error appears in the above-identified patent and that said Letters Patent is hereby corrected as shown below:

Claim 1, column 10,
Line 13, "utilized" should read "unitized".

Claim 20, column 11,
Line 24, "gap-controlled" should read "gap-controlling".

Signed and Sealed this

Thirteenth Day of April, 2010

David J. Kappos

David J. Kappos
*Director of the United States Patent and Trademark Office*